Jan. 27, 1942.   R. O. PEARSON   2,271,130
BUFFING AND SHAPING MACHINE FOR TIRES AND THE LIKE
Filed Aug. 21, 1939   3 Sheets-Sheet 2
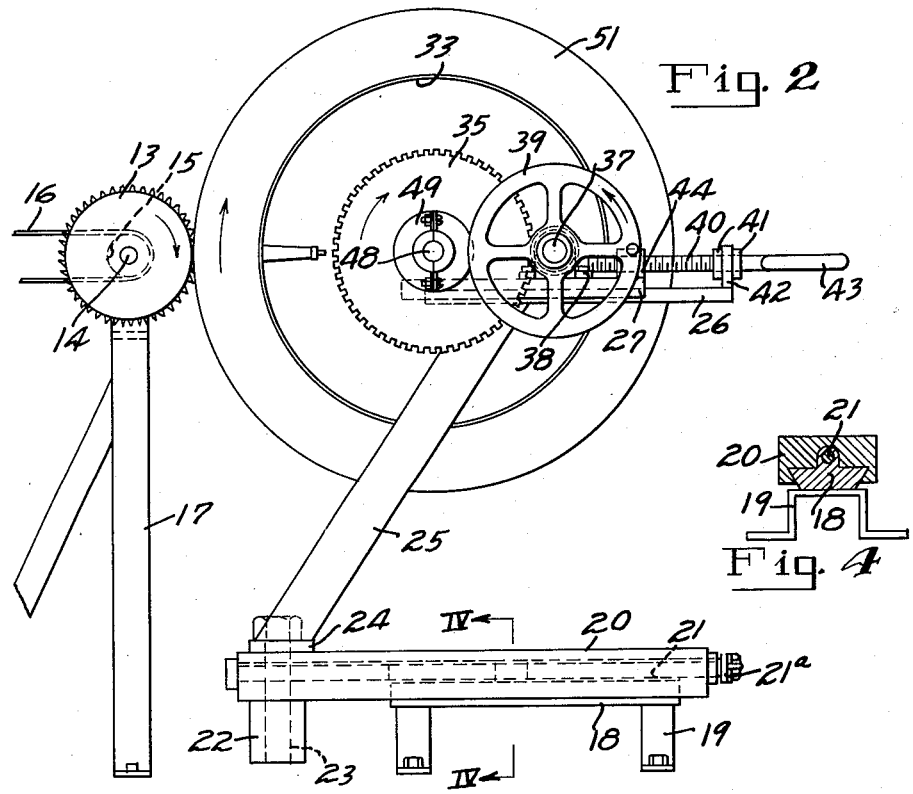
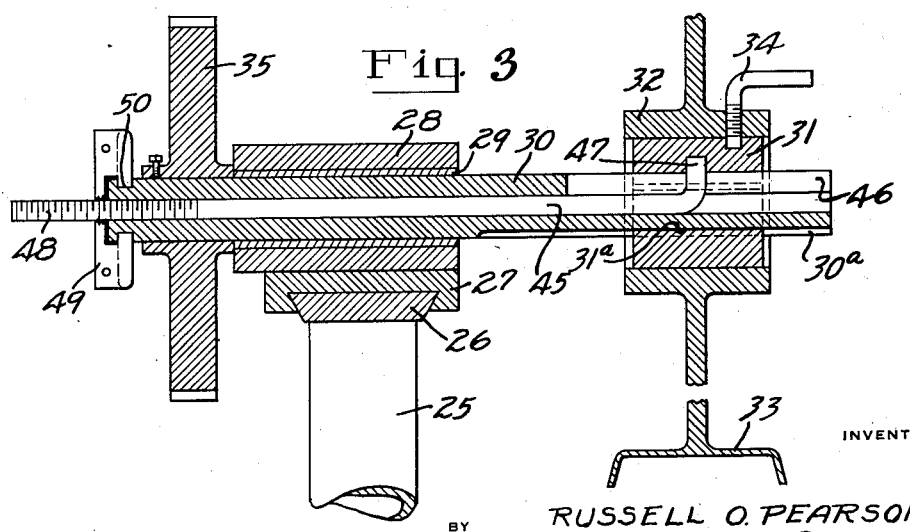
INVENTOR
RUSSELL O. PEARSON
BY
ATTORNEYS Jan. 27, 1942.   R. O. PEARSON   2,271,130
BUFFING AND SHAPING MACHINE FOR TIRES AND THE LIKE
Filed Aug. 21, 1939   3 Sheets-Sheet 3
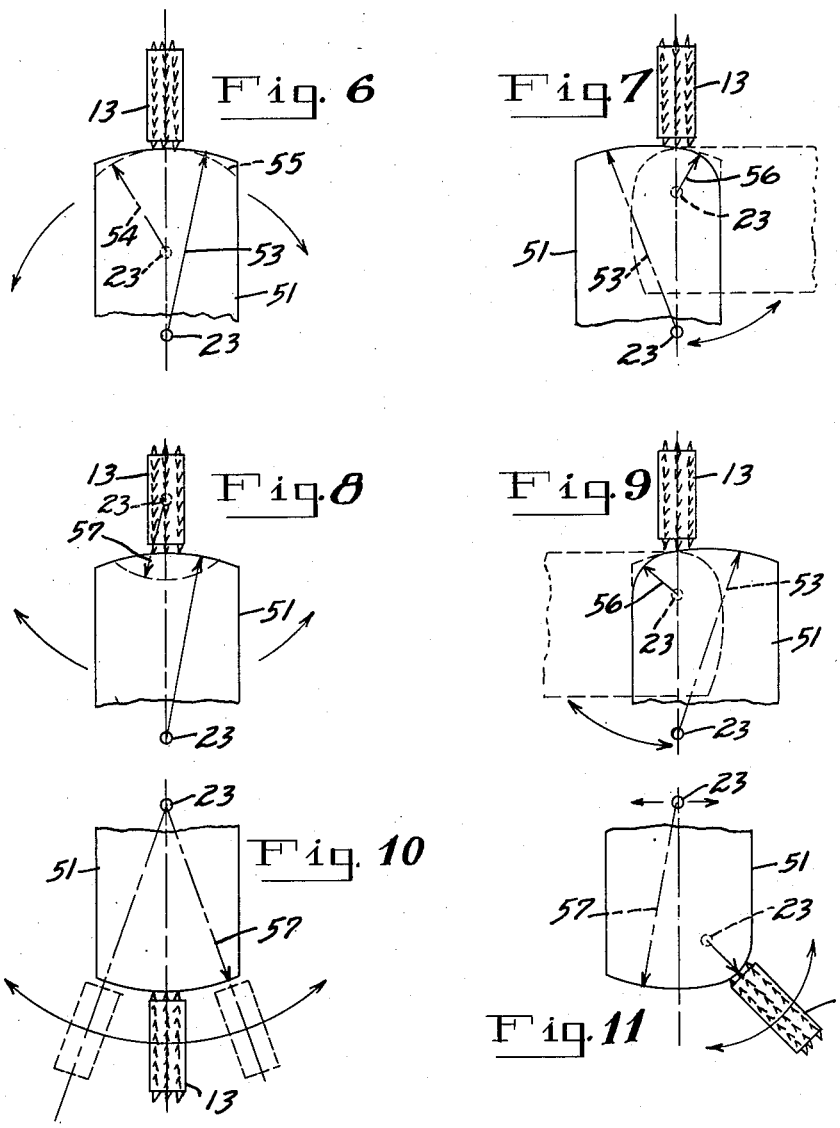
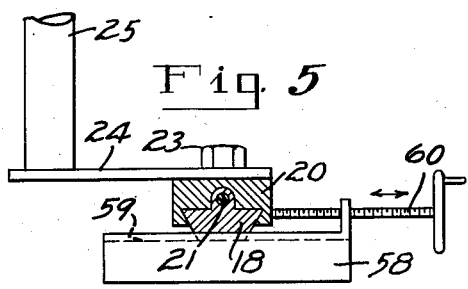
INVENTOR
RUSSELL O. PEARSON
BY
ATTORNEYS Patented Jan. 27, 1942

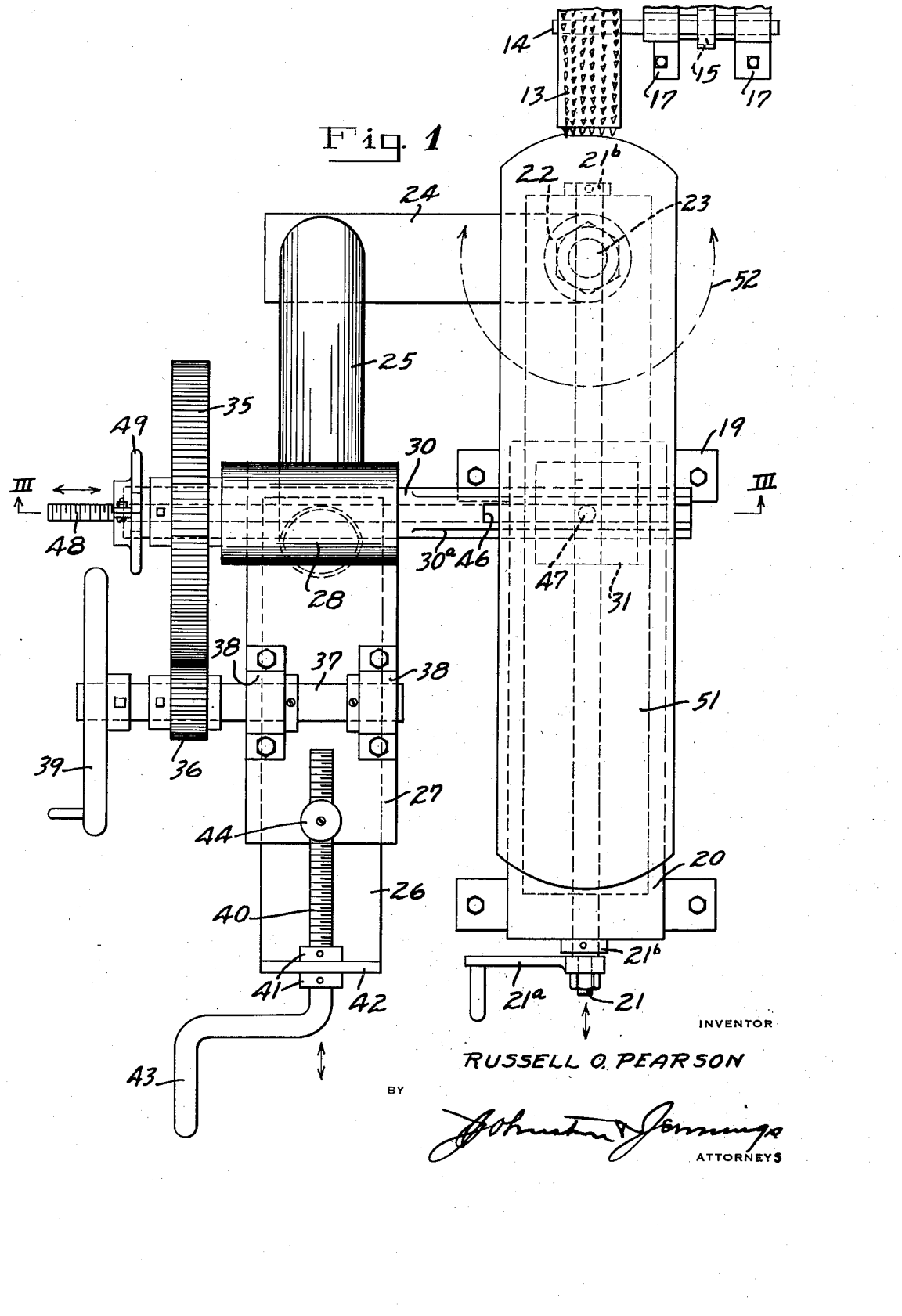

2,271,130

UNITED STATES PATENT OFFICE 2,271,130

BUFFING AND SHAPING MACHINE FOR TIRES AND THE LIKE

Russell O. Pearson, Birmingham, Ala.

Application August 21, 1939, Serial No. 291,203

4 Claims. (Cl. 51—97)

My invention relates to buffing or shaping machines which are primarily designed for the buffing and shaping of the treads of tires to perfect the running balance of new tires and to provide for the retreading, recapping and balancing of worn tires.

My invention is particularly concerned with a novel combination of adjustments effective between the work and the buffing or shaping tool whereby cuts having any desired radius lying in either a convex or concave plane may be applied to any part of the work which, if rotated relative to the tool, can be cut accurately to produce an annulus of the desired transverse curvature in which all planes normal to its axis will be true circles.

My invention, as applied to the tire buffing machines, contemplates the rotary mounting for the tire so that it can be turned by hand or motor driven and, in the preferred arrangement, such mounting is upon a swing stand that is rotatable about a vertical axis which is adjustable to positions on either side of a plane tangent the point of engagement between the tool and the tire surface to be shaped, thereby determining both the radius of the cut that will be made and whether it will produce a concave or convex curvature in the work.

My invention further contemplates mounting on the adjustable swing stand for the work suitable adjustments both laterally of and towards the shaping tool whereby the tire can be set to the desired initial working relationship of the latter preliminary to receiving a swivel motion about the swing stand axis.

My invention further contemplates mounting the shaping tool and its drive means on the adjustable swing stand which is also mounted for lateral adjustment relatively to the work, the tool mounting on the stand providing the necessary lateral and longitudinal adjustments to set the tool to cut the selected arc and curvature on the work.

It is a distinctive characteristic of my shaping apparatus that all curves are cut from set positions of the adjustable tool or work centers, or both, and all cuts will be made accuraately without requiring a coincidental manipulation of any part other than to swing the tire or tool about the axis that will have been correctly set for making the desired cut.

My invention is illustrated in its embodiment as a tire buffing machine in the accompanying drawings which form a part of this specification but it will be understood that it is not thereby to be limited to such use.

In the drawings:

Fig. 1 is a plan view of the machine with the buffing wheel broken away and the tire rotatably mounted on a swing stand set to cut a convex tread of a given radius on the tire.

Fig. 2 is a side elevation of Fig. 1.

Fig. 3 is a sectional view taken on the line III—III of Fig. 1, and illustrating the mechanism for effecting lateral adjustment of the tire supporting shaft relative to the plane of adjustment of the swing stand on which it is mounted.

Fig. 4 is a cross sectional view taken on the line IV—IV through the swing stand adjusting guides of Fig. 2.

Fig. 5 is a view corresponding to Fig. 4 showing the provision for the lateral adjustment of the swing stand relative to the work when the buffing tool is mounted on the swing stand.

Figs. 6 to 9 are diagrammatic views illustrative of adjustments for effecting different cuts with the work mounted on the swing stand.

Figs. 10 and 11 are views showing the manner of controlling the cuts when the shaping tool is mounted on the swing stand.

Similar reference numerals refer to similar parts throughout the drawings.

In describing my invention in connection with the shaping of a tire tread, it is to be understood that the tire is typical of any work to be shaped and the buffing wheel is symbolic of any cutting, grinding, shaping or polishing tool suitable for use on the work.

In the embodiment of my invention illustrated in Figs. 1 to 4, in which the work is shown as a tire mounted on the swing stand, a buffing wheel 13 is mounted on a shaft 14 carrying a pulley 15 driven by a belt 16 from any suitable source of power, the buffer being mounted in a suitable frame 17 rigidly anchored and braced in operating position. In a plane normal to the buffing wheel axis I mount a fixed slide guide 18 fast on suitable fixed supports 19 and having a slide 20 adjustably engaged thereon and movable relatively thereto by means of an adjusting screw shaft 21 having at one end an operating crank 21a and a stop collar 21b. On the forward end of the slide 20 I mount rigidly a swivel block 22 having a vertical bore therethrough adapted to receive a swiel pin or pivot 23 for the swing stand. The pivot is made fast to one end of a base 24 having welded or otherwise rigidly secured to its other end a tubular standard 25 inclined approximately at an angle of 90° away from the buffing wheel. I mount on the upper end of this standard a slide guide 26 disposed parallel with the guide 18, upon which slides the plate or carriage 27 carrying a transverse bearing 28 in which a sleeve 29 is mounted and adapted to receive a shaft 30. A mounting block 31 is mounted on the inner end of shaft 30 and adapted to receive the hub 32 for a rim 33 upon which the tire to be buffed is mounted. The hub 32 is locked by means of a set screw 34 to the block 31 and the latter has splines 31a in its inner bore and engaged in key ways 30a in the shaft 30 by means of which the tire support is rotatably and adjustably mounted on shaft 30 and adapted to be driven by any suitable means, such as the gear wheel 35 meshing a small gear 36 on a countershaft 37, having suitable bearings 38 on the carriage 27 and driven by a motor or, preferably, by a hand wheel 39 keyed thereon.

An adjusting screw shaft 40 for the carriage 27 is held rotatably mounted by collars 41 in a shoulder 42 at one end of the guide 26, its outer end being shaped to form the crank 43 and its inner end being in threaded engagement in a threaded boss 44 on the slide 27. By turning crank 43 the slide, and with it the tire mounting, can be adjusted bodily toward and from the tool in a direction parallel with the adjustment provided for the swing stand slide 20.

An adjusting rod 45 is mounted in a center bore in the shaft 30, which has an axial slot 46 extending through its end upon which the hub block 31 is mounted. The rod 45 has an angled end 47 which is slidable in the slot 46 and adapted to be engaged in a socket provided near the center of the bore in the block 31, it being understood that this end 47 will first be engaged in this socket and then telescoped into the bore of shaft 30 as the latter is inserted through its bearings 28 and through the hub block 31. The adjusting rod 46 has its outer end 48 threaded and a split hand wheel 49 is screwed thereon. This hand wheel is formed with shoulders which engage in an annular groove 50 cut in the outer end of the shaft 30 and is free to turn thereon and as it turns it acts to force the adjusting rod 45 axially through the shaft 30 to shift the block 31 and the tire mounting element 33 axially of the shaft 30.

It will be noted that the slide adjustments described provide for shifting both the tire mounting slide 27 and the swing stand supporting slide 20 independently in parallel planes, and quite a long adjustment is provided for both of these elements and particularly for the swing stand slide 20, so that it is capable of being adjusted to shift the swing stand pivot 23 for a considerable distance on either side of a vertical plane tangent to the working edge of the buffing tool 13, and as this slide 20 is adjusted forward, the slide 27 can be run back so as to set the tire 51 in proper position to be engaged and buffed by the wheel 13, regardless of the setting of the swing stand pivot.

In operation, and referring to Fig. 1, I show the tire set up to the buffing wheel and adapted to have its tread surface cut on a convex arc having a radius equal to the distance from the center of the pivot 23 to the cutters on the buffing tool. The extent of this cut is indicated as having started from the right and to be progressing to the left, and to accomplish this the swing stand is being rotated slowly clockwise swinging the tire on the arc 52 while it is being rotated on its axis 30. This radius corresponds substantially to the radius 53 shown in the diagrammatic view, Fig. 6. If it be desired to cut away the shoulders of the buffed tread on a shorter radius such as indicated at 54, then the pivot 23 for the swing stand is shifted forward to its dotted position shown, and by swinging the stand from side to side through the necessary arc, the shoulders will be cut away on the shorter radius curve indicated by the dotted line 55, whereas the tread was cut on the wider radius curve determined by the radius 53.

In case it be desired to buff the sides and produce a very short radius cut confined entirely to the shoulder portions of the tread, this is accomplished by shifting the work laterally by rotating hand wheel 49 until the tire is displaced as indicated in Fig. 7, and then the swing stand pivot 23 is shifted to the dotted position shown, whereupon the tire can be presented as shown in dotted lines and a cut made on the extremely short radius 56 to reduce the shoulder and buff the sides of the tread on the right. By displacing the tire correspondingly to the right of the buffing wheel, as shown in Fig. 9, the left corner and side can be similarly buffed.

In Fig. 8 I show the pivot 23 for the swing stand adjusted beyond a vertical plane tangent to the working edge of the buffing wheel, by means of which I can produce a concave cut in the tread about the radius 57, and this cut as to its depth can be controlled by setting the swing stand pivot to give the desired radius.

In Figs. 5, 10 and 11 I show a modification of my invention in which the tire or work is rotatably mounted on a stationary support and the tool is mounted upon the swing stand and given all of the adjustments already described, by means of which the swing stand pivot can be adjusted toward and from the work and then swung about the pivot to produce the cut. In this arrangement the tool and the drive merely take the place of the tire and its drive in the apparatus as shown in Figs. 1 to 3, and the duplication of the illustration of such parts is therefore unnecessary to explain the operation as illustrated in Fig. 10 where the swing stand pivot is shown set the desired distance beyond a plane tangent to the working edge of the tool which is shown swinging about the radius 57 to produce a cut corresponding to that shown in Fig. 7, assuming the radii 53 and 57 equal. However, to make the shoulder cuts as shown in Figs. 7 and 9, it becomes necessary, when the tool is the adjustable element, to provide means to shift the pivot for the swing stand laterally with relation to the central place through the tire circumference and this is readily accomplished as shown in Fig. 5 by substituting for the supports 19 of Fig. 4 a slide support 58 working in a slide guide 59 under control of an adjusting screw 60, which parts correspond to the elements 26, 27 and 40 of Fig. 1. By this means the pivot 23 can be shifted to the right to cut the right hand shoulder on the radius as shown in Fig. 11, and then correspondingly shifted past center to the left to make a similar cut on the left hand shoulder of the tire.

In addition to the cuts already described, my invention is readily adapted to make a cut which is of particular value in preparing a tire for recapping, wherein it is proposed to cut a circumferential channel in the old tread leaving the shoulders uncut so that the cap strip can be seated flush in this channel. Such a cut is readily made with my apparatus, it being only necessary to set the tire, as shown in Fig. 1, against the tool and to turn the crank 21a so as to advance the tire a distance corresponding to the desired depth of the channel. Having cut the channel to the desired depth, the swing stand is then swung through the desired arc which will produce a channel of the desired width, the side walls of which can be made to stand either parallel or at any pitch, according to the shape of the tool. When thus cut a cap strip can be vulcanized into place flush with the uncut tread and leaving the sides and shoulders undisturbed.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a tire buffing machine having a pivoted swing stand, a rotatable tire receiving shaft on the swing stand, a buffing tool, and means to move said shaft and tire into engagement with the tool, the combination of means to move the pivot of the swing stand transversely of the tool, and means associated with said shaft and tire whereby the latter may be moved axially on the shaft while both are in rotation.

2. In a tire buffing machine comprising a pivoted swing stand, a buffing tool, means to move the swing stand toward and from said tool, and means to move the pivot of the swing stand transversely of the tool, the combination of a rotatable hollow shaft mounted on the swing stand and adapted to receive a tire on one end, and means at the other end of said shaft and operably associated with the tire to move it axially of the shaft while in rotation.

3. In a tire buffing machine comprising a pivoted swing stand, a buffing tool, and means to vary the relative distance between the tool and the swing stand, the combination of a rotatable hollow shaft on the swing stand, a tire receiving hub slidably mounted on one end of the shaft, a member passing through said shaft and connected with said hub, and means at the other end of said shaft associated with said member to move said hub axially of the shaft.

4. In a tire buffing machine comprising a pivoted swing stand, and a buffing tool, the combination of a rotatable hollow shaft on the swing stand, a tire receiving hub slidably mounted on one end of the swing stand, a tire on said hub, a rod passing through the shaft and having one end connected to said hub, a threaded portion on the other end of said rod, a hand wheel associated with said threaded portion of said rod and said shaft whereby the hub will be moved axially of the shaft upon rotation of the hand wheel, means to present the buffing wheel to the periphery of the tire, and means to selectively position the pivot of said swing stand on either side of a vertical plane passing through the point of contact of said buffing tool with said tire to selectively cut concave and convex surfaces on the periphery of said tire.

RUSSELL O. PEARSON.